United States Patent [19]

Frey

[11] 4,245,343
[45] Jan. 13, 1981

[54] AUTOMATIC SHUNT DEVICE

[75] Inventor: Ronald G. Frey, Emerson, N.J.

[73] Assignee: Data Line Corporation, Dumont, N.J.

[21] Appl. No.: 944,804

[22] Filed: Sep. 22, 1978

[51] Int. Cl.³ .............................................. G06F 11/20
[52] U.S. Cl. .................................. 371/11; 340/147 R; 364/900
[58] Field of Search ............... 235/303, 303.4, 303.41; 364/200, 900; 340/147 R, 147 SC; 179/15 AL

[56] References Cited

U.S. PATENT DOCUMENTS

| Re. 28,958 | 9/1976 | Zafiropulo et al. | 340/147 SC |
| 3,245,043 | 4/1966 | Gaffney, Jr. et al. | 340/147 R |
| 3,581,075 | 5/1971 | Mattsson et al. | 235/303.4 |
| 3,599,179 | 8/1971 | Arnold | 235/303.4 |
| 3,652,798 | 3/1972 | McNeilly et al. | 179/15 AL |
| 3,716,834 | 2/1973 | Adams | 340/147 R |
| 3,879,710 | 4/1975 | Maxemchuk et al. | 364/200 |
| 4,075,440 | 2/1978 | Laubengayer | 340/147 SC |

Primary Examiner—Charles E. Atkinson
Attorney, Agent, or Firm—Lerner, David, Littenberg & Samuel

[57] ABSTRACT

A system is provided for automatically bypassing an inoperative data terminal so that other data terminals connected in series therewith will continue to receive data transmitted from a central data processor. The system includes data terminal status indicators, a manual bypass capability, and a remote audiovisual alarm.

7 Claims, 4 Drawing Figures

AUTOMATIC SHUNT DEVICE

BACKGROUND OF THE INVENTION

This invention relates to data transmission systems, and in particular to apparatus for shunting data terminals.

A well-known technique for supplying data from a central processor to a plurality of data terminals includes the series connection of said terminals, in a serial data loop, to output and input terminals of said central processor. The data received by the first data terminal in said series connection is sent on by said first terminal to the second series connected terminal and so on around the serial loop and back to the central data processor. With such a system, whenever one of the data terminals becomes inoperative, it interrupts operation of the entire data loop. Such interruptions often cause unacceptable system downtime. Several approaches have been employed for putting the remaining non-defective terminals back into an operative data loop.

One well-known technique is to employ a manual bypass switch for each data terminal which has the capability of completely disconnecting the data terminal from the data loop while at the same time providing a direct shunt which reestablishes the series circuit and thus allows data to pass to the remaining terminals. With such arrangements the bypass switches for the various terminals are oftentimes mounted on a common switchboard to provide a central location for connecting or disconnecting each of the terminals in the loop.

U.S. Pat. No. 4,035,770 issued to Sarle on 12 July 1977, discloses a scanning system for locating and isolating a faulty terminal in a series connection of terminals. With that system, when the data loop is broken due to a faulty terminal, a scanner circuit sequentially energizes bypass relays associated with each of the terminals. When the offending terminal is reached in the sequence, the data loop is reinstated and said offending terminal is located and eliminated from the loop at the same time. This arrangement requires that the data loop be out of commission during the time that the scanning is going on. For a large system this scanning time, which represents downtime, may be undesirably long.

U.S. Pat. No. 4,015,241 issued to Takezoe on 29 Mar. 1977 shows in FIG. 2 thereof a pair of bypass switches Ra and Rb which are used to shunt a communications terminal. Nothing in this patent appears to disclose what causes the switches to be actuated. The patent does disclose an arrangement for checking the working condition of an addressed terminal and for transmitting information to said address terminal only when said terminal is in a working condition. The purpose of Takezoe is to increase the transmission efficiency of the system by eliminating the time that would be wasted during addressing of non-working terminals.

U.S. Pat. No. 3,876,983 issued Apr. 8 1975 and its reissue Pat. No. Re. 28,958 issued Sept. 7 1976 to Zafiropulo, et al. show a system for bypassing portions of a series loop with portions of a parallel loop. It is an example of a very complex arrangement for locating and isolating faulty data terminals.

U.S. Pat. No. 3,716,834 issued to Adams on Feb. 13 1973 discloses a data transmission system for locating and isolating circuit faults. Interrogation pulse signals are sent out from a central station to remote terminals, and reply signals are analyzed to determine the nature and location of the fault. This again is a complex arrangement requiring specialized central station interrogating and receiving apparatus.

U.S. Pat. No. 3,601,806 issued to Heimbigner on Aug. 24 1971 shows a complex bidirectional transmission system which includes the capability of deactivating and bypassing certain remote terminals using a sequential interrogation arrangement accomplished by means of clock pulses transmitted from a master station to the remote terminals.

U.S. Pat. No. 3,519,750 issued to Deresin, et al., on July 7 1970 discloses a complex communications system employing a second standby channel in combination with complex electronic switching gear for automatically reestablishing a broken transmission link between succesive stations.

None of the above-mentioned patents disclose or suggest the simple, instantaneously and automatically operating terminal shunting circuit of the instant invention.

It is therefore an object of this invention to provide automatic means for bypassing an inoperative data terminal in a series connection of data terminals, wherein said inoperative data terminal is instantaneously disconnected and shunted.

It is a further object of this invention to provide easily interpreted visual indications of the operating condition of a data terminal.

It is yet a further object of this invention to provide an audio and visual alarm system for designating an inoperative data terminal, including a manually operated switch capable of activating said automatic shunt while simultaneously disconnecting said remote alarm system.

SUMMARY OF THE INVENTION

In accordance with the invention, a central data processor and a plurality of data terminals are connected serially for transmission of data from the central processor through the data terminals and back to the data processor. Accociated with each of the data terminals in the serial data loop, is an automatic shunt circuit which senses output data leaving its associated data terminal and being transmitted onto the next terminal in the serial loop. When the data sensor in the shunt circuit detects a cessation of data flowing out of its associated data terminal, the data sensor enables a relay coil driver. The coil driver then energizes a relay coil which in turn causes the switching of a two pole double throw relay. The relay is wired so that when energized it disconnects the associated data terminal from the serial loop and at the same time reestablishes the serial loop by a direct through connection. When the non-operating data terminal is reactivated, the data sensor instantaneously disables the relay coil driver and the terminal is thus reinserted into the data loop. A manual switching means is also provided for energizing the relay coil so that the associated data terminal can be manually bypassed using this same apparatus. Colored light emitting diodes are used in the circuit to indicate the operational status of the data terminal, and a remote audio-visual alarm system is connected to be actuated when the circuit has automatically bypassed its associated data terminal. As such, the circuit provides a simple and effective means for bypassing an inoperative terminal as well as providing for non-disruptive routine maintenance of the terminal.

DETAILED DESCRIPTION

Figure 1:
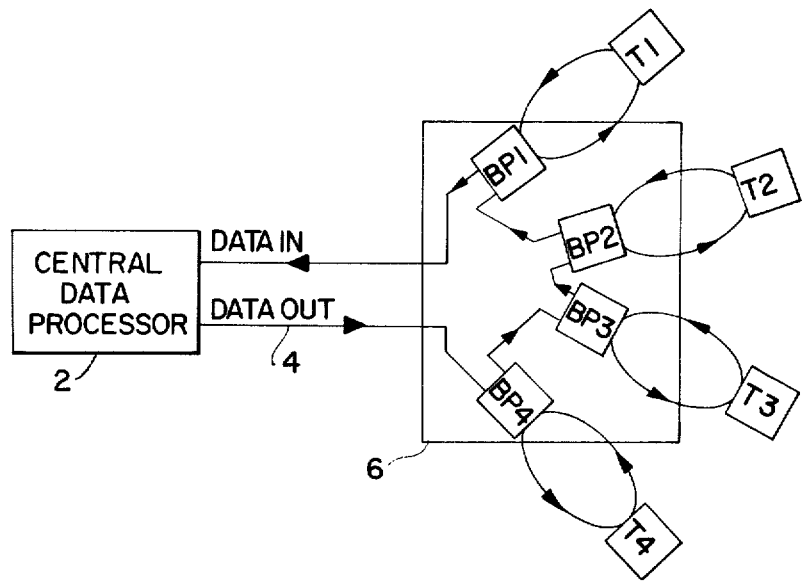
FIG. 1 shows an example of a known manual terminal by-pass arrangement.

Referring now to FIG. 1, therein depicted is a known arrangement which provides for the manual bypassing of individual terminals which are connected in a serial data loop. The central data processor 2 transmits data out along data cable 4 through manual bypass switch BP4 and on to data terminal T4. Once the data is received by data terminal T4, it is then transmitted on in the direction shown by the arrows through bypass switch BP4 and by-pass switch BP3 to data terminal T3. The data continues to work its way around the serial loop until finally returning to the central data processor 2.

If any one of the data terminals T1-T4 becomes inoperative, it disables the entire data loop. Once the offending terminal has been located, its associated manual bypass switch may be operated to isolate that terminal and reestablish the data loop. The manual bypass switches BP1-BP4 are three pole double throw switches connected in a conventional manner to accomplish the desired isolation and bypass function. These bypass switches are normally mounted on a common manual bypass switchboard. With this arrangement a single defective data terminal will cause the entire data loop to go out of order until the defective terminal's associated bypass switch is manually operated, thus resulting in an undesirably long system downtime.

Figure 2:
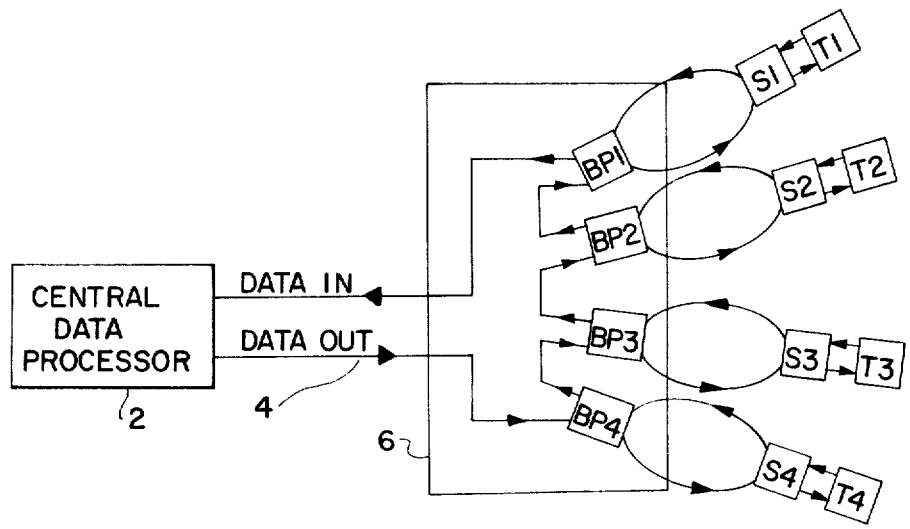
FIG. 2 shows one example of an installation of the apparatus of the instant invention for automatic data terminal bypassing.

FIG. 2 shows a modification of the above-described prior art arrangement wherein the automatic shunt circuits S1-S4 (as depicted in detail in FIG. 5) according to the instant invention are interposed between the manual bypass switches BP1-BP4 and the data terminals T1-T4. With the arrangement of FIG. 2, the automatic shunts S1-S4 are installed at the data terminal locations.

Figure 3:
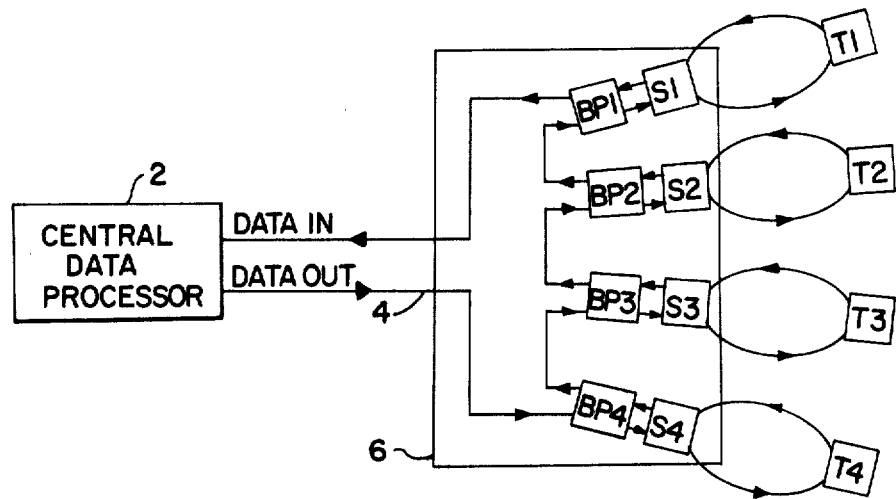
FIG. 3 shows another convenient application of the apparatus of the invention.
Figure 5:
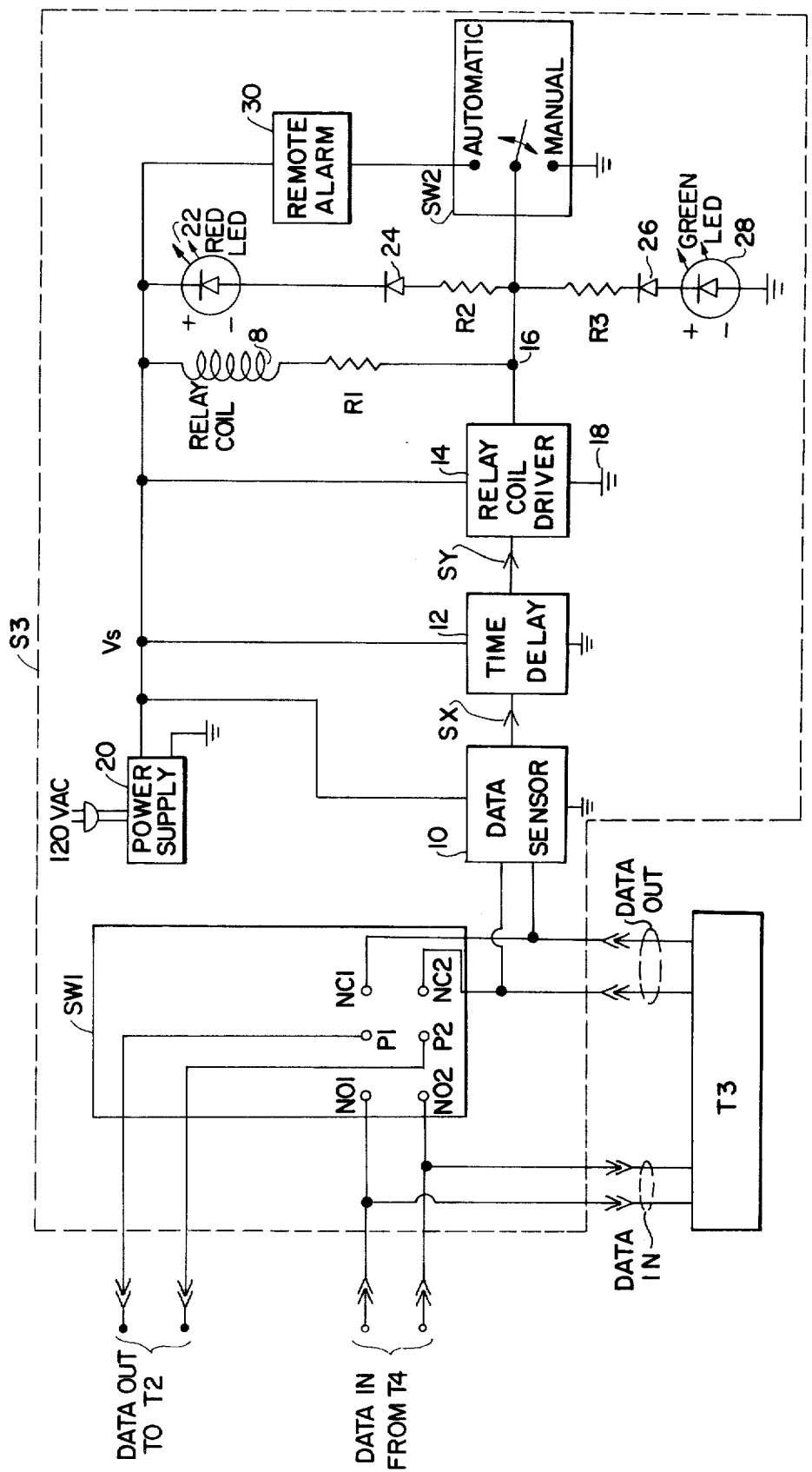
FIG. 5 shows a circuit diagram of a preferred embodiment of an automatic shunt circuit for use with the instant invention.

FIG. 3 depicts an arrangement wherein the automatic shunt circuits S1-S4 of FIG. 5 according to the instant invention are mounted at the location of the manual bypass switchboard. This arrangement includes the desirable feature of additionally providing for the automatic monitoring by the automatic shunt circuits S1-S4 of the condition of the data cables connected between the terminals T1-T4 and the switchboard 6.

Figure 4:
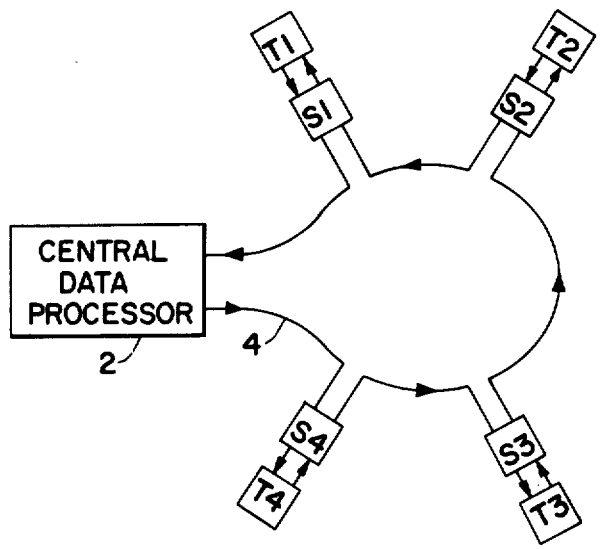
FIG. 4 shows yet another useful configuration employing the automatic shunt apparatus of this invention.

Another useful arrangement employing the automatic shunt circuit of FIG. 5 according to this invention is shown in FIG. 4. With this configuration the manual bypass switchboard 6 of FIGS. 1, 2, and 3, is eliminated altogether. The automatic shunts S1-S4 are the only means of bypassing their associated date terminals T1-T4. This is a practical arrangement, since according to the invention the automatic shunts S1-S4 are operable both in an automatic and a manual mode. Thus there is no real need for additional manual bypass switches.

A preferred embodiment for an automatic shunt circuit according to the instant invention is shown within the dotted lines of FIG. 5. The circuit is shown as an automatic bypass for data terminal T3 as depicted in FIGS. 2, 3, and 4.

SW1 is a double pole double throw relay which is connected as shown so that when its associated relay coil 8 is unenergized, the relay pole contacts P1 and P2 are connected to the normally closed terminals NC1 and NC2. Thus, when the relay coil 8 remains unenergized, the data received from data terminal T4 is sent directly through to data terminal T3 and then transmitted from data terminal T3 through relay SW1 and on to data terminal T2.

The data flow out of data terminal T3 is monitored by data sensor 10. Such sensors are well-known in the digital circuit art and are commonly employed to determine the absence or presence of digital data at a particular point in a circuit. When the sensor 10 detects the absence of digital data at the data out terminals of data terminal T3, the sensor generates a warning signal SX. This signal is applied to time delay circuit 12. If the data flow from the DATA OUT terminals of data terminal T3 is interrupted for more than a predetermined time, as is programmed into time delay circuit 12, it in turn activates the relay coil driver 14. When activated, this relay coil driver presents a low impedance between terminal 16 of resistor R1 and system ground terminal 18. Thus energizing current flows from the power supply 20 through the relay coil 8 and its current limiting resistor R1.

When energized, the relay coil 8 causes the relay SW1 to disconnect poles P1 and P2 from terminals NC1 and NC2 respectively, and in turn connect poles P1 and P2 to terminals NO1 and NO2 respectively. As a result, the data terminal T3 is disconnected from the data loop and is replaced with a direct through connection. The relay SW1 will stay in this condition until digital data again is produced at the DATA OUT terminals of data terminal T3.

When relay coil 8 is energized, the output voltage Vs of power supply 20 appears across the series connection of the red light emitting diode 22 and its associated current limiting diode 24 and resistor R2. Thus a red visual warning signal is generated when data terminal T3 is disconnected and bypassed.

When data terminal T3 is in proper working condition, and data is being generated at its DATA OUT terminals, no warning signal SX is generated. With this situation the relay coil driver 14 presents a very high impedance between ground terminal 18 and terminal 16. Thus the relay coil 8 is deenergized except for a very small current which flows through it and on through the series connection of current limiting diode 26, resistor R3, and green light emitting diode 28. Thus when data terminal T3 is operational, a green visual signal is generated.

Switch SW2 is a single pole double throw switch which provides the circuit with both a manual and an automatic mode. When the switch SW2 is in the AUTOMATIC position, a remote audiovisual alarm is connected across the series connection of the relay coil 8 and its current limiting resistor R1. Thus when the relay coil 8 is energized, the remote alarm 30 is also activated, and it remains activated until such time as data terminal T3 again generates output data or until switch SW2 is turned to the MANUAL position.

When switch S2 is put in the MANUAL position, the relay coil 8 will be energized regardless of the operational status of data terminal T3. Thus, switch SW2 can be used to implement the bypassing of the data terminal for reasons other than a malfunction of the terminal —such as, for example, the performance of routine maintenance on the terminal equipment. The whole shunt circuit S3 is energized by power supply 20 which in turn is connected to a standard 120 volt alternating current line.

It is to be understood that numerous modifications apparent to those skilled in the art could be made to the above-described preferred embodiment without departing from the spirit and scope of the invention as recited in the following claims.

What is claimed is:

1. An automatic shunt system for bypassing a data terminal having input terminals connected to an input data cable and out-put terminals for supplying output data comprising: means for sensing the presence of absence of output data at said output data terminals; and switching means responsive to an output signal of said sensing means for connecting said output data terminals to an output data cable only when data is present at said output data terminals, and for connecting said input data cable to said output data cable when data is absent at said output data terminals.

2. An automatic shunt system according to claim 1, including means for inhibiting the transfer of said sensing means output signal to said switching means for a predetermined time period.

3. An automatic shunt system according to claim 1, including visual display means responsive to said sensing means for indicating which of said connections has been made by said switching means.

4. An automatic shunt system according to claim 3, wherein said visual display means comprise light emitting diodes.

5. An automatic shunt system according to claim 1, including audio and visual alarm means responsive to said sensing means for indicating when said input cable has been connected to said output cable by said switching means, said alarm means including a manual alarm disconnect switch.

6. An automatic shunt system according to claim 1, including means for manually activating said switching means.

7. An automatic shunt system according to claim 1, wherein said switching means comprises a multiple pole, double throw relay and a relay coil driver connected thereto.

* * * * *

UNITED STATES PATENT AND TRADEMARK OFFICE
CERTIFICATE OF CORRECTION

PATENT NO. : 4,245,343
DATED     : January 13, 1981
INVENTOR(S) : Ronald G. Frey It is certified that error appears in the above-identified patent and that said Letters Patent are hereby corrected as shown below:

Column 3, line 64, "date" should read --data--.

Signed and Sealed this

Fourteenth Day of April 1981

[SEAL]

Attest:

RENE D. TEGTMEYER

Attesting Officer     Acting Commissioner of Patents and Trademarks

REEXAMINATION CERTIFICATE (901st)

United States Patent [19]

Frey

[11] B1 4,245,343

[45] Certificate Issued   Jul. 26, 1988

[54] AUTOMATIC SHUNT DEVICE

[75] Inventor: Ronald G. Frey, Emerson, N.J.

[73] Assignee: Data Line Corporation, Dumont, N.J.

Reexamination Request:
   No. 90/001,340, Sep. 28, 1987

Reexamination Certificate for:
   Patent No.: 4,245,343
   Issued: Jan. 13, 1981
   Appl. No.: 944,804
   Filed: Sep. 22, 1978

Certificate of Correction issued Apr. 14, 1981.

[51] Int. Cl.⁴ .............................................. G06F 11/20

[52] U.S. Cl. .................................. 371/11; 340/825.37; 364/900

[58] Field of Search .................. 371/11; 364/200, 900; 340/825.05, 825.16; 370/16, 86, 15; 379/2

[56]       References Cited
       U.S. PATENT DOCUMENTS 3,458,661  7/1968  Forde et al. ........................... 370/15
   4,035,770  7/1977  Sarle ....................................... 371/11

*Primary Examiner*—Charles E. Atkinson

[57]            ABSTRACT

A system is provided for automatically bypassing an inoperative data terminal so that other data terminals connected in series therewith will continue to receive data transmitted from a central data processor. The system includes data terminal status indicators, a manual bypass capability, and a remote audiovisual alarm.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-7, dependent on an amended claim, are determined to be patentable.

1. An automatic shunt system for bypassing a data terminal having input terminals connected to an input data cable and out-put terminals for supplying output data comprising: means for sensing the presence [of] *or* absence of output data at said output data terminals; and switching means responsive to an output signal of said sensing means for connecting said output data terminals to an output data cable only when data is present at said output data terminals, and for connecting said input.

* * * * *